US005493880A

United States Patent [19]
Jang

[11] Patent Number: 5,493,880
[45] Date of Patent: Feb. 27, 1996

[54] STRUCTURE OF LOCK MOUNTING RACK FOR THE SHIFT LEVER OF A CAR

[76] Inventor: Jaw-Jia Jang, 6th Fl, No. 36-5, He-Ping Road, Pan-Chiao City, Taipei County, Taiwan

[21] Appl. No.: 257,131

[22] Filed: Jun. 9, 1994

[51] Int. Cl.$^6$ ................................................ B60R 25/06
[52] U.S. Cl. .............................. 70/202; 248/558; 16/353; 16/239; 16/386; 16/381; 403/84; 403/294; 70/247; 70/461; 70/39; 70/387
[58] Field of Search .............................. 70/245, 247, 248, 70/258, 237, 238, 201, 202, 203, 211, 212, 345, 387, 405, 386, 38 A, 38 B, 38 R, 38 C, 39, 451, 461; 248/558, 159; 16/353, 239, 365, 386, 381; 403/83, 84, 87, 103, 294

[56] References Cited

U.S. PATENT DOCUMENTS

| | | | |
|---|---|---|---|
| 957,033 | 5/1910 | De Bruycker | 70/38 A |
| 1,039,576 | 9/1912 | Mueller et al. | 411/910 |
| 1,743,331 | 1/1930 | Ellison | 70/387 |
| 2,820,669 | 1/1958 | Lowe | 16/365 |
| 4,630,333 | 12/1986 | Vickers | 16/386 |
| 4,693,099 | 9/1987 | Cykman | 70/203 |
| 4,895,333 | 1/1990 | Antinora | 248/558 |
| 5,228,320 | 7/1993 | Liou | 70/202 |
| 5,230,231 | 7/1993 | Liou | 70/38 A |
| 5,295,375 | 3/1994 | Jonas | 70/247 |
| 5,372,019 | 12/1994 | Hsiao | 70/39 |

*Primary Examiner*—Darnell M. Boucher
*Attorney, Agent, or Firm*—Bacon & Thomas

[57] ABSTRACT

The improved structure of a lock mounting rack includes a receiving seat for receiving a lock, a plurality of connecting rods and position limiting rods; and further includes a card insertion type lock for an automatic or a manual shift lever, the lock further has a housing, a lock seat, a locking mechanism, a latching mechanism and an insertion type locking card; insert the locking card into the housing, the lock can be unlocked thereby, such locking card can increase the safety in duplicating-proofing and is easier for carrying in a pocket than a conventional key; the rack can suit various types of the seats for the shift levers in various types of cars, the cost of moulding thus is largely reduced.

12 Claims, 14 Drawing Sheets

5,493,880

STRUCTURE OF LOCK MOUNTING RACK FOR THE SHIFT LEVER OF A CAR

BACKGROUND OF THE INVENTION

1. Field of the Invention

The present invention relates to an improved structure of a lock mounting rack for the shift lever of a car, which includes mainly a receiving seat for receiving a lock, a plurality of connecting rods and position limiting rods; and further includes a card insertion type lock for the shift lever, the lock for the shift lever has a housing, a lock seat, a locking mechanism, a latching mechanism and an insertion type locking card.

2. Description of the Prior Art

A conventional mounting rack (A) for a lock device for the shift lever of an automobile (referring to FIG. 14) is provided on one side of a seat (B) for the shift lever to receive a lock, the lock can limit the position of the shift lever to obtain a function of theft-proofing. Therefore, the mounting racks (A) for receiving the locks are made of stiff carbon steel and are firmly fixed on the body of the automobile to prevent them from being dismantled by thieves to render the lock to be of no effect. However, there are a variety of automobiles in the market, and the seats for the shift levers are different in shape, hence there are a variety of mounting racks for locks to be correspond to the heights and shapes of the seats, yet each mounting rack can only suit one type of car, even more, whenever a new type of car goes on the market, the manufacturer thereof must make a new mould to produce new mounting racks, and the distributors thereof must have the storage and the exhibition rooms increased for selling. Yet there are enormous number of types of car on the market, so that not only the cost of manufacturing is largely increased, the storage volume and investing amount of the distributors are kept high, and lastly the consumers is heavily loaded by the transferring of the cost to them.

SUMMARY OF THE INVENTION

The main object of the present invention is to provide an improved structure of a lock mounting rack for the shift lever of a car, which suits various types of seats for shift levers.

The secondary object of the present invention is to provide an improved structure of a lock mounting rack for the shift lever of a car, which can be changed according to various shapes of seats for shift levers, the manufacturers need not to add other moulds for adapting to the various types of new cars, and the distributors need not have too many stored stocks.

Another object of the present invention is to provide an improved structure of a lock mounting rack for the shift lever of a car, wherein the mounting rack can suit various types of locks beside the lock of the present invention.

The present invention will be apparent in re the realitical structure, characteristics and functions thereof after reading the detailed description of the preferred embodiment thereof in reference to the accompanying drawings.

DETAILED DESCRIPTION OF THE PREFERRED EMBODIMENT

Figure 1:
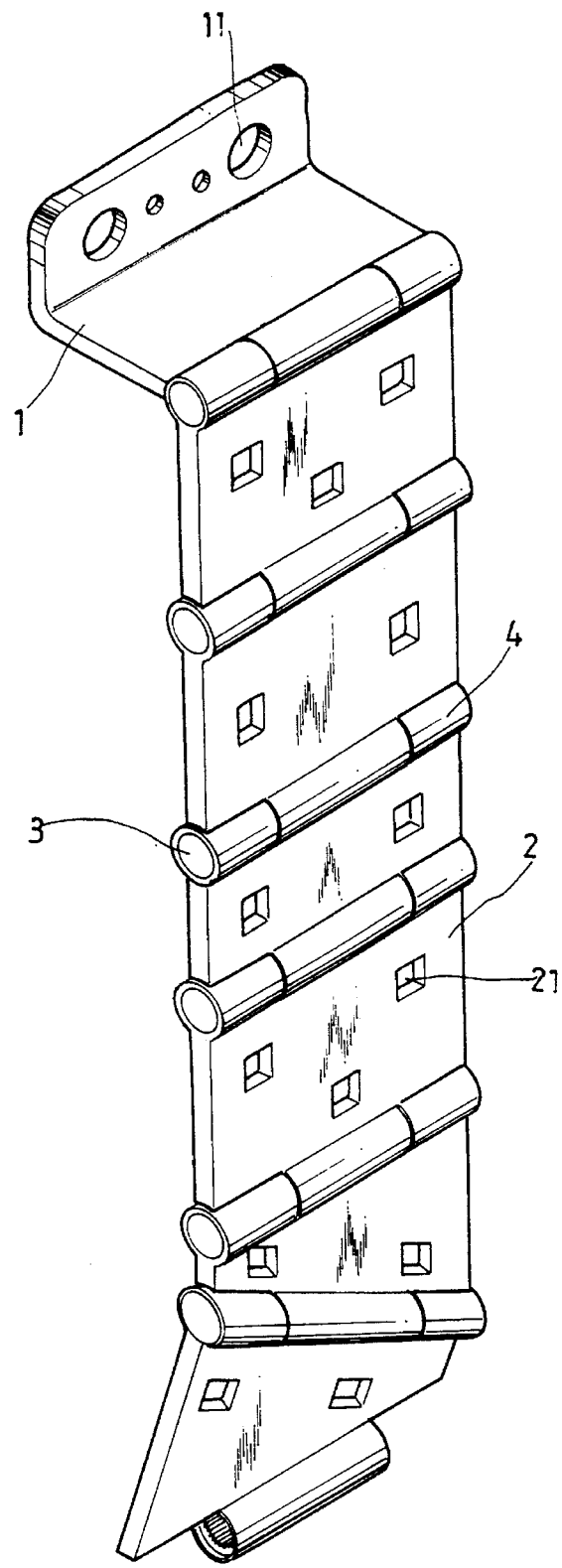
FIG. 1 is a perspective view of an assembled embodiment of the rack of the present invention.
Figure 2:
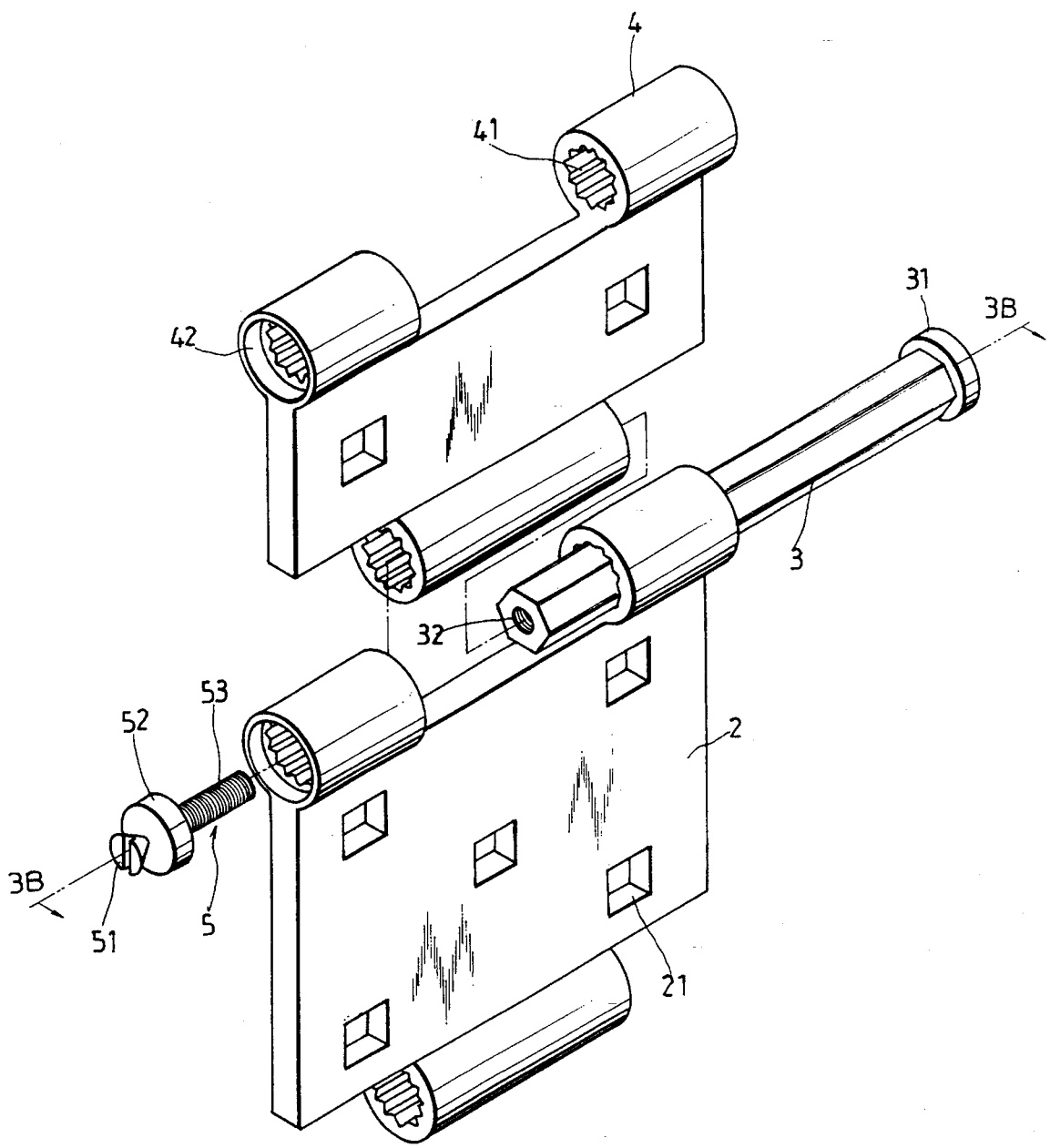
FIG. 2 is a perspective view of a connecting and fixing mechanism of the present invention.
Figure 3A:
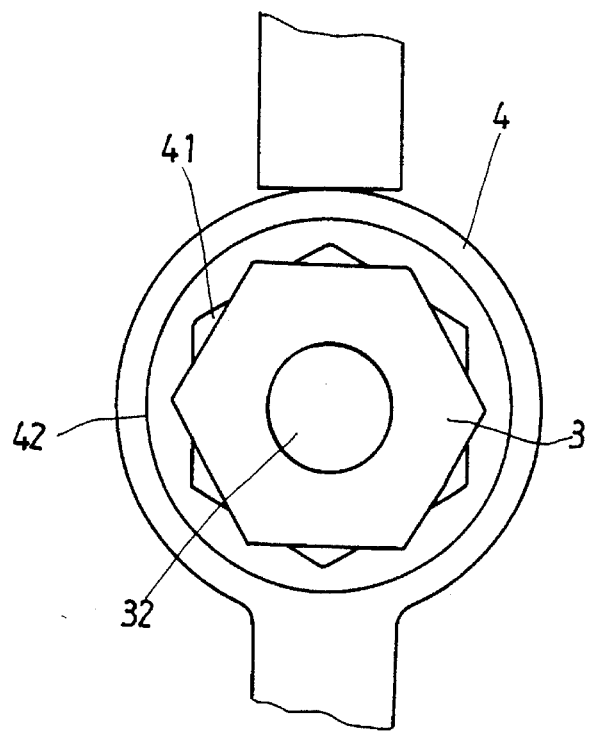
FIG. 3A is a side view of a position limiting rod or polygonal shaft of the present invention telescopically inserted in the polygonal inner walls of a plurality of fixed sleeves.
Figure 3B:
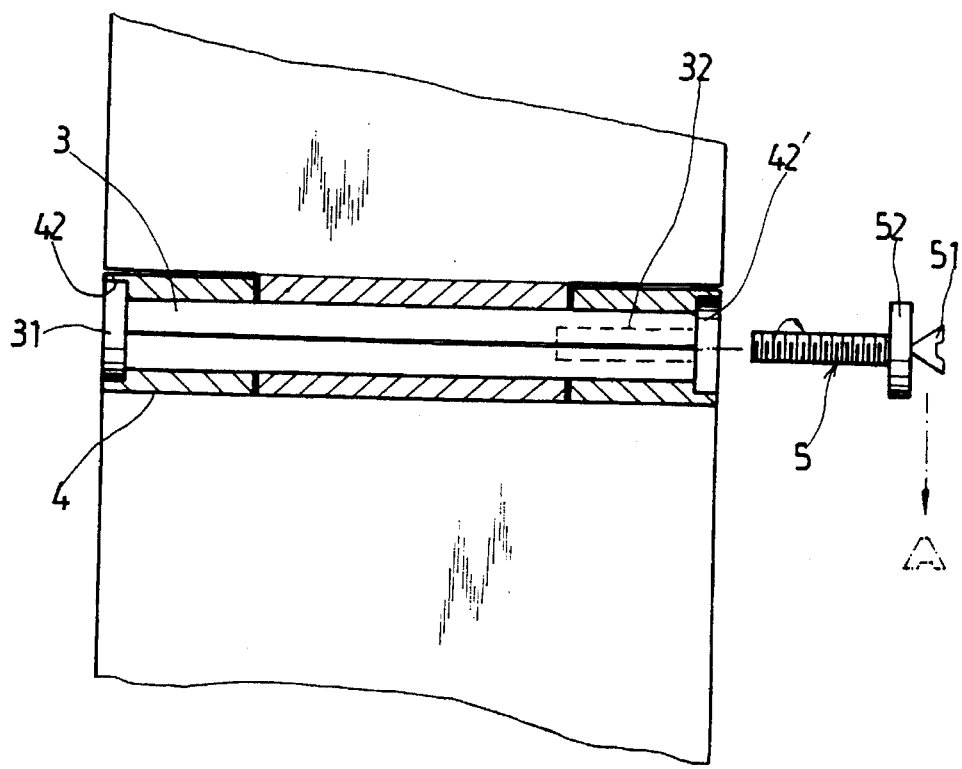
FIG. 3B is a front sectional view taken from a section line 3B—3B in FIG. 2, showing the position limiting rod or polygonal shaft of FIG. 3A is telescopically inserted in the fixed sleeves of FIG. 3A and is stuffed unmovably therein by twisting off a top end of a screw screwed therein.
Figure 4:
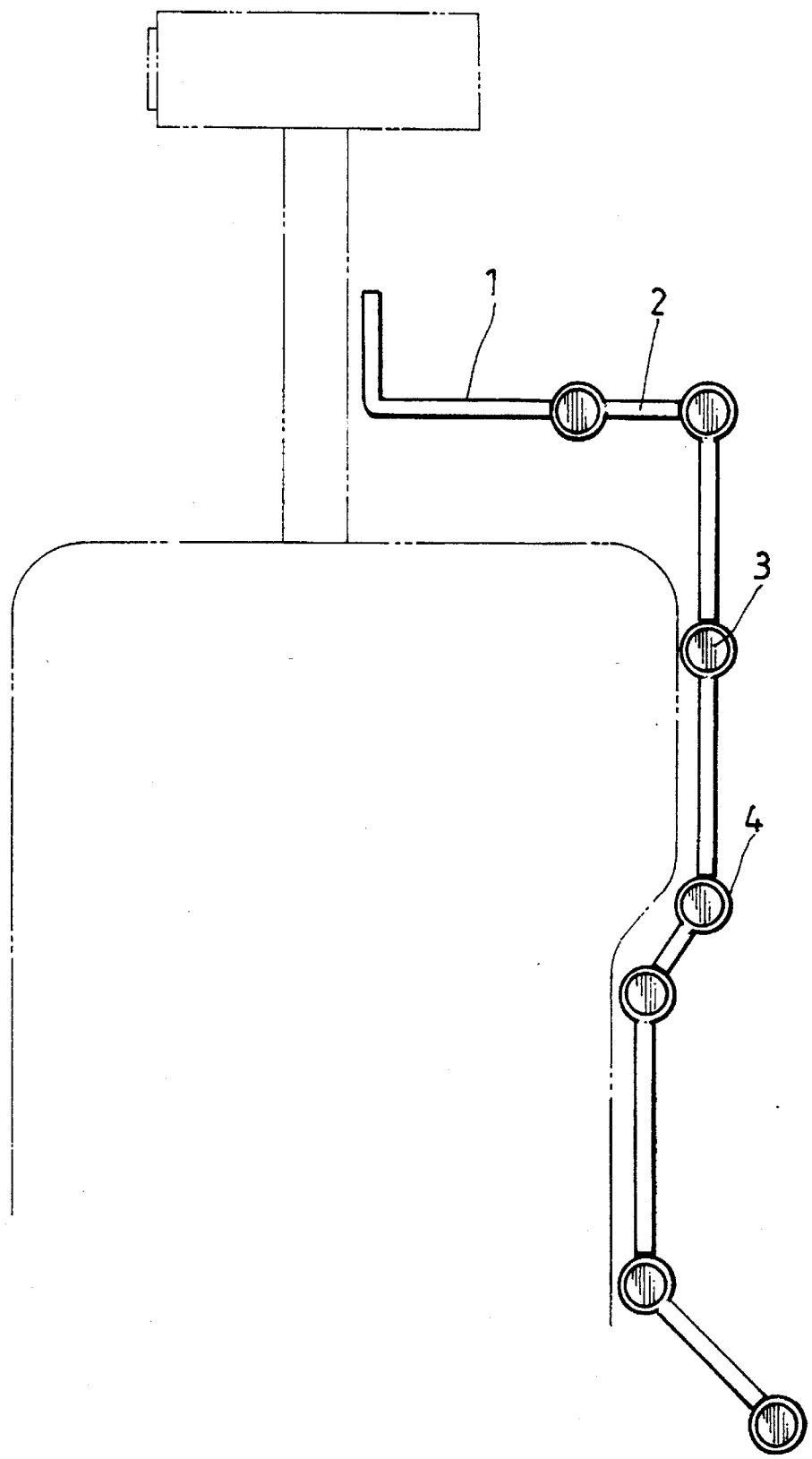
FIG. 4 is the first embodiment of the rack portion of the present invention.
Figure 5:
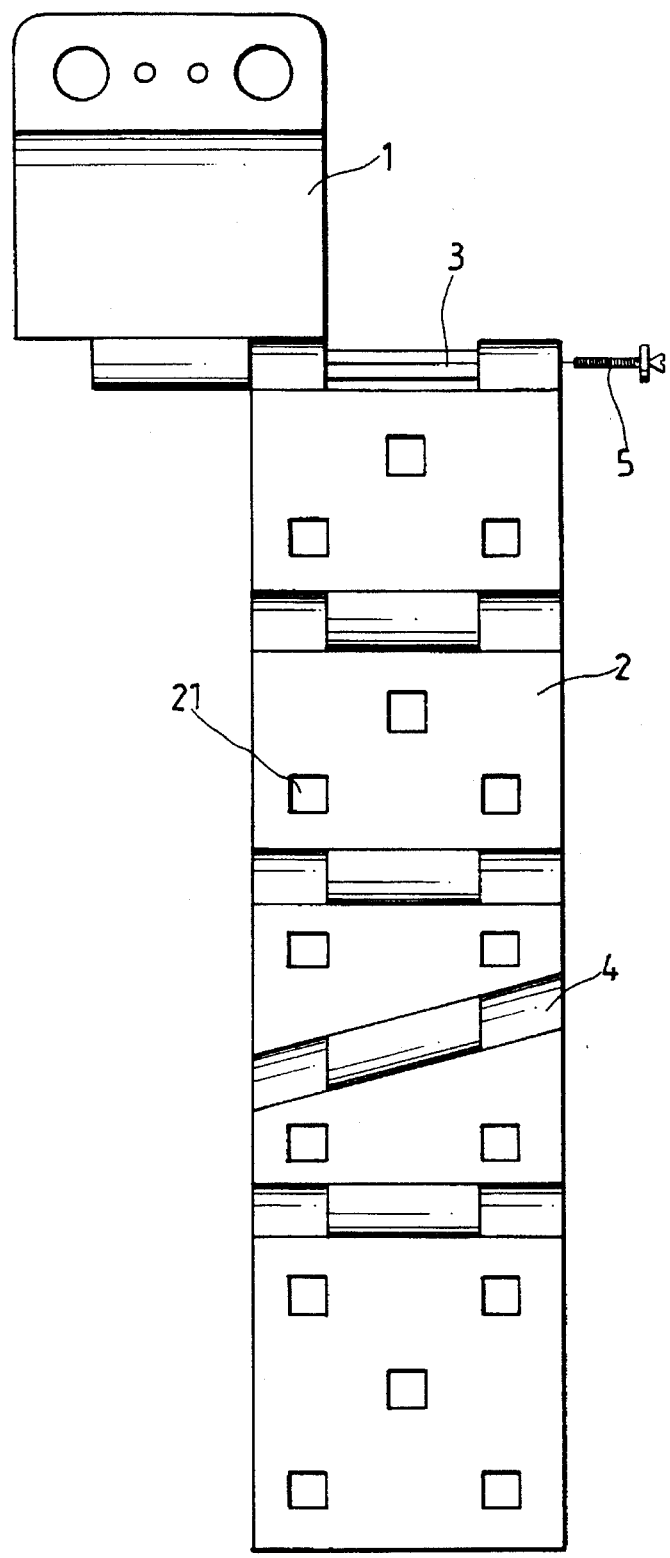
FIG. 5 is the second embodiment of the portion of FIG. 4.
Figure 6:
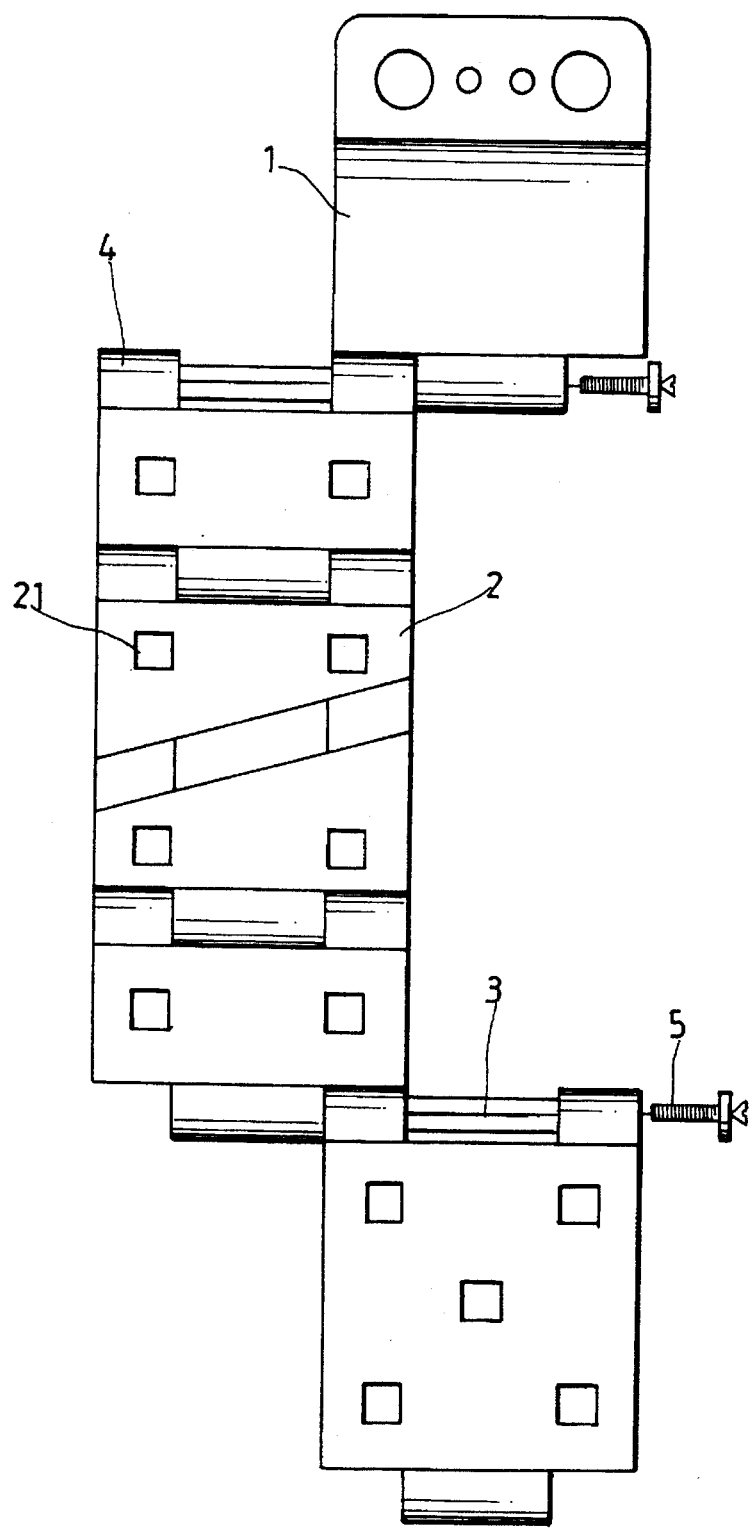
FIG. 6 is the third embodiment of the portion of FIG. 4.

It can be clearly seen in FIG. 1 that the improved structure of a lock mounting rack for the shift lever of a car includes mainly a receiving seat 1 to receive a lock, a plurality of connecting plates 2 with different length, size and shape, and a plurality of position limiting rods 3, wherein the receiving seat 1 has a plurality of locking holes 11 and the connecting plates 2 have a plurality of locating holes 21 respectively used for fixing, at one side edge of the receiving seat 1 and at both upper and lower ends of each of the connecting plates 2 there are fixing sleeves 4 capable of being aligned horizontally with corresponding one(s) on the neighbouring receiving seat 1 or connecting plate 2; the fixing sleeves 4 each have a polygonal inner wall 41 (referring to FIG. 2),and both ends thereof are prolonged to provide two position limiting holes 42, the receiving seat 1 and the connecting plates 2 can be abutted on each other vertically, and can be adjusted in intersecting angles thereof with each other pursuant to the shape of the side wall of a seat for the shift lever, the inner side faces of the plates 2 abut against the seat for the shift lever; the position limiting rods 3 are elongated polygonal shafts, the length thereof is slightly shorter than the width of the plates 2, they can have different length for adapting to the plates 2 of rectangular shape and that with bevel sides such as shown in FIG. 1, one end of each position limiting rod 3 is enlarged to form a stop piece 31, the other end is provided with a threaded hole 32, a screw 5 can be screwed in it, the top end 51 of the screw 5 is of a conical shape with the narrower end thereof connecting with a stop piece 52 having the same size as that of the position limiting rod 3, the screw 5 has a threaded shaft 53. After the receiving seat 1 and the connecting plates 2 are assembled pursuant to the shape, height of the seat for the shift lever as shown in FIG. 1, the fixing sleeves 4 which have been adjusted in their orientation for connecting are aligned horizontally, so that the position limiting rods 3 can be inserted into the sleeves 4; the strip shape of the position limiting rods 3 and the polygonal inner walls 41 of the fixing sleeves 4 allow the position limiting rods 3 to extend through the corresponding fixing sleeves 4 (FIG. 3A) which are aligned with each other, the intersecting angles thereof can be fixed by abutting between these angles of the polygons of the rods 3 and the walls 41; after the position limiting rods 3 extend through the corresponding fixing sleeves 4, each stop piece 31 at one end of each rod 3 can fit exactly in the position limiting hole 42 on the outer end of a fixing sleeve 4 (as shown in FIG. 3B), the other end of the rod 3 is gotten even with a position limiting hole 42' on the corresponding end of the fixing sleeve 4; if the above mentioned screw 5 is screwed in the threaded hole 32 on the other end of the position limiting rod 3, the stop piece 52 of the screw 5 is embedded in the position limiting hole 42', force is continually exerted after the stop piece 52 abuts the base portion of the position limiting hole 42' to twist off the conical top end 51 from the stop piece 52, so that the position limiting rod 3 is mounted unmovably in the sleeve 4, and the upper and lower plates 2 therefore have a fixed intersecting angle therebetween; in pursuance of this, all connecting plates 2 are installed, while last of all, as shown in FIG. 2, 4 and 5, the connecting plates 2 are fixed on the car body by welding or riveting, and the assembly of the mounting rack of the lock for the shift lever can thus be completed, wherein the shape of one side of the mounting rack is conformed with the seat for the shift lever, this arrangement suits automatic shift levers which can only move forward and backward.

Figure 7:
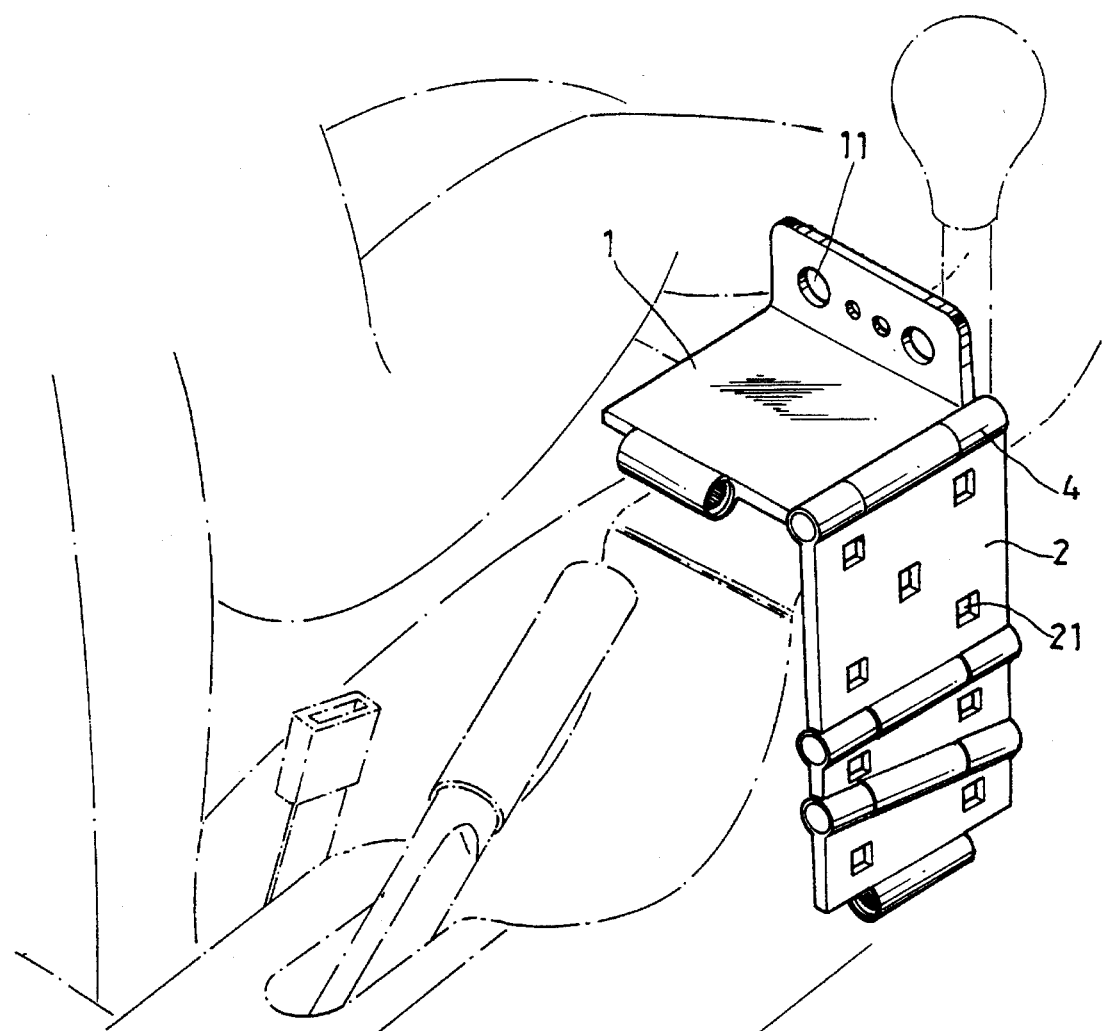
FIG. 7 is the fourth embodiment of the portion of FIG. 5.

This mounting rack can be assembled to form various shape, length (please refer to FIG. 5, 6), so that the manufacturers only need to produce large amount of the plates 2 in various shape and size, and of the position limiting rods 3, the screws 5 etc., they can suit the seats for the shift levers in various types of cars, the cost of production and the cost and space for storage can be largely reduced no matter that they are assembled antecedently, or are assemble by the distributors, or even assembled by the owner of a car. Further, the receiving seat 1 of the present invention provides on another lateral edge an additional fixing sleeve 4 (as shown on the front edge in FIG. 7) to adapt to the need of a seat for a manual shift lever (which can be moved to and fro in a transverse direction of a car, the receiving seat 1 must be turned ninety degrees to avoid the upright part thereof obstructing the operation of the shift lever) for completion of connecting of the sleeves 4 on the connecting plates 2 to the additional sleeve 4 on the receiving seat 1, the usage of the mounting rack can thus be increased.

Figure 8:
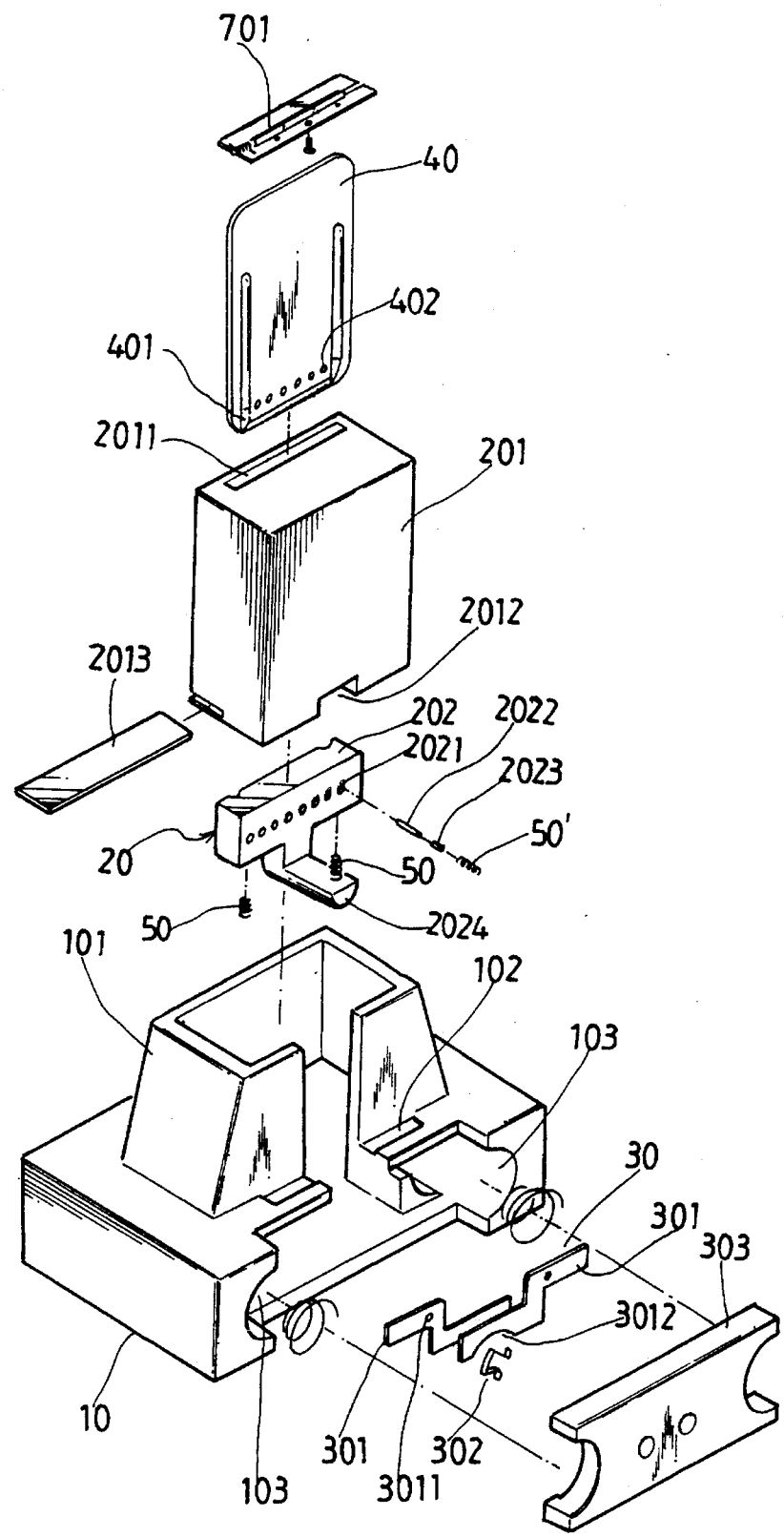
FIG. 8 is a an exploded perspective view of the interior structure of a lock used with the present invention.
Figure 9:
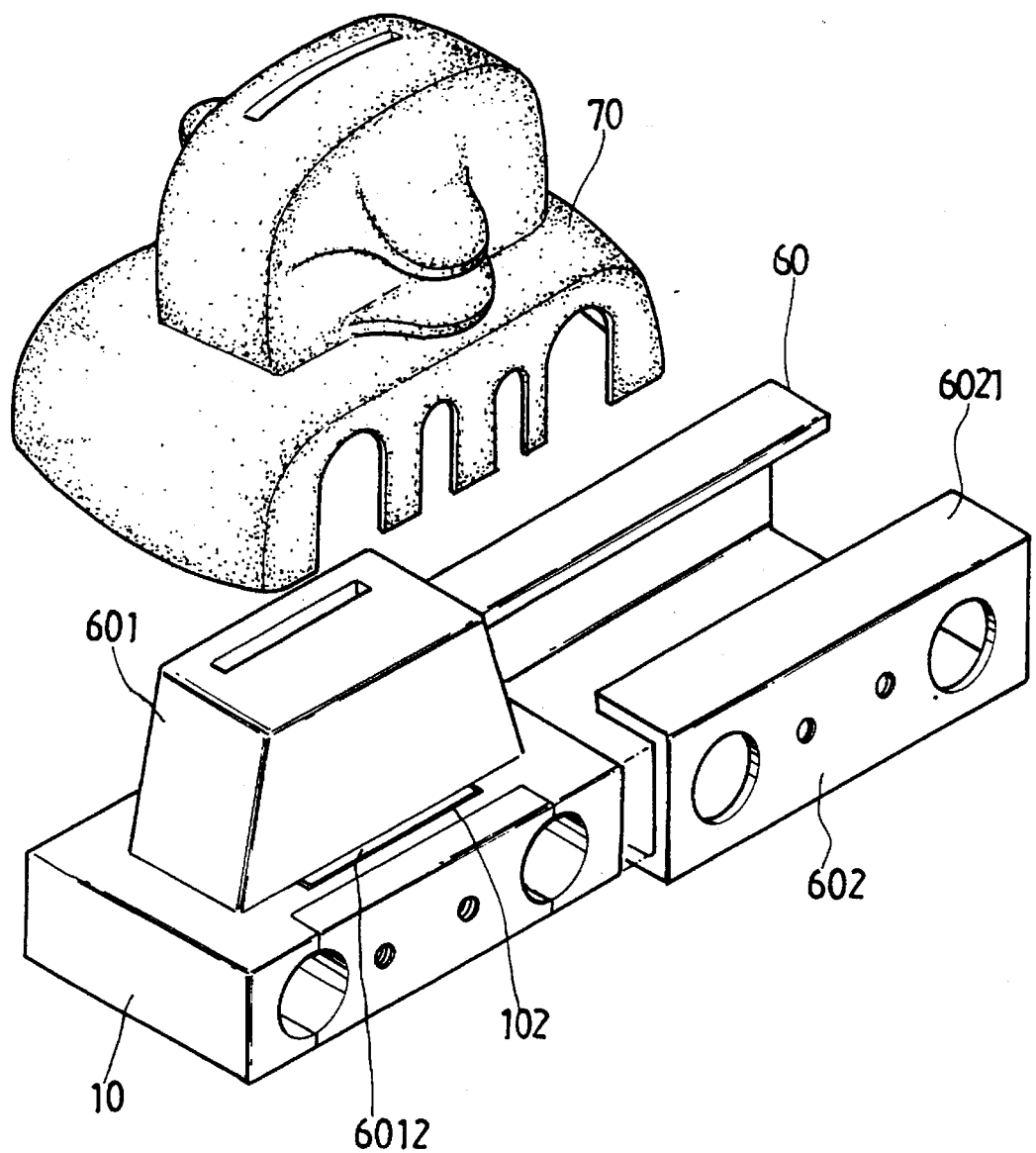
FIG. 9 is an exploded perspective view showing the housing and the hood of the lock of FIG. 8 being assembled.

This lock mounting rack further includes a card insertion type lock for the shift lever. The lock for the shift lever (referring to FIG. 8, 11A, 11B) comprises mainly a lock seat 10, a locking mechanism 20, a latching mechanism 30 and a locking card 40, wherein the locking mechanism 20 and the latching mechanism 30 are provided respectively on the central top end and the front side of the lock seat 10, on the top end of the lock seat 10 and at both sides of a receiving chamber 101 for the locking mechanism 20 there are fixing grooves 102, while on the front side of the lock seat 10 there are two locking holes 103 provided at the two ends of the latching mechanism 30 each for insertion of a U shaped locking hook to be latched and locked by the latching mechanism 30. The locking mechanism 20 is composed of a fixed seat 201 and a slide block 202, wherein the slide block 202 is received in the fixed seat 201 and is provided with two springs 50 on the bottom thereof, the shape of the slide block 202 is a widened T, a plurality of transverse holes 2021 are provided therein at the position slightly lower than the middle thereof for receiving a plurality of locating shafts 2022 having various length and having a conical shape on the end thereof, at the front end of each locating shaft 2022 there is a segment of shaft 2023 and a spring 50' to constantly keep the locating shaft 2022 in a state of pressing backwardly, at the middle and lower position of all the locating shafts 2022 which are aligned horizontally, an operating rod 2024 is provided; the receiving chamber (not shown) for the slide block 202 on the top end of the fixing seat 201 has a shape conforming with that of the slide block 202, and at the rear edge of the top end there is a card insertion slot 2011 having a width as that of an insertion type locking card 40, an insertion plate 2013 is inserted in the bottom of the fixed seat 201 and near the rear side thereof, after the slide block 202 is put upwardly into the fixed seat 201, the insertion plate 2013 can be inserted into the fixed seat 201, thus the springs 50 are abutted against the bottom of the insertion plate 2013, so that the slide block 202 can keep on being constantly pressed upwardly; an operating hole 2012 is provided on the front end of the fixed seat 201 to allow the operating rod 2024 to slide vertically; the above mentioned latching mechanism 30 comprises mainly two stop pieces 301, an elastic element 302 and a fixing plate 303, wherein the stop pieces 301 are in Z shape, the lower portions of these stop pieces 301 are located parellel to each other, a pivot-point 3011 at the upper portion of each of these stop pieces 301 is provided between the locking holes 103, the outer edge of the upper portion of each stop piece 301 is aligned with the corresponding locking hole 103; each stop piece 301 has an arc shaped recess 3012 to receive the elastic element 302, the fixing plate 303 is fixed at the front side of the lock seat 10 after the stop pieces 301 and the elastic element 302 are assembled for preventing the members from dropping. The above mentioned insertion type locking card 40 has at each side on the bottom of the front surface thereof a position limiting groove 401, beneath and between the position limiting grooves 401 there are a line of horizontally aligned holes 402 which are in an amount equal to that of the locating shafts 2022, the diameter of the holes 402 is corresponding to the length of the locating shafts 2022 (will be explained later). The lock proper (not including the insertion type locking card 40, referring to FIG. 9) after assembling can be telescopically installed in a housing 60 which is composed of an inner hood 601 and a U shaped protecting sleeve 602, wherein the inner hood 601 covers the receiving chamber 101 on the top end of the lock seat 10, a slot is provided on the top end of the inner hood 601 for aligning with the card insertion slot 2011, the two sides of the bottom of the inner hood 601 are opposite to the fixing grooves 102 mentioned above and each is provided with a fixing flange 6012, so that when the inner hood 6011 covers the fixed seat 201, the fixing flanges 6012 are fitted exactly in the fixing grooves 102, there and then, the top ends of the fixing flanges 6012 are on the same level as is the top surface of the lock seat 10, after installing, the lock seat 10 and the inner hood 601 are moved transversely to fit in the U shape protecting sleeve 602, when this is finished, the U shape protecting sleeve 602 can limit the inner hood 601 by the wing plates 6021 on the top end thereof and extending toward the middle portion thereof, an outer hood 70 for decoration covers them and completes the lock assembly. Wherein the outer hood 70 has on its top a dust-proof piece 701 aligned with the card insertion slot 2011 (referring to FIG. 8).

Figure 10:
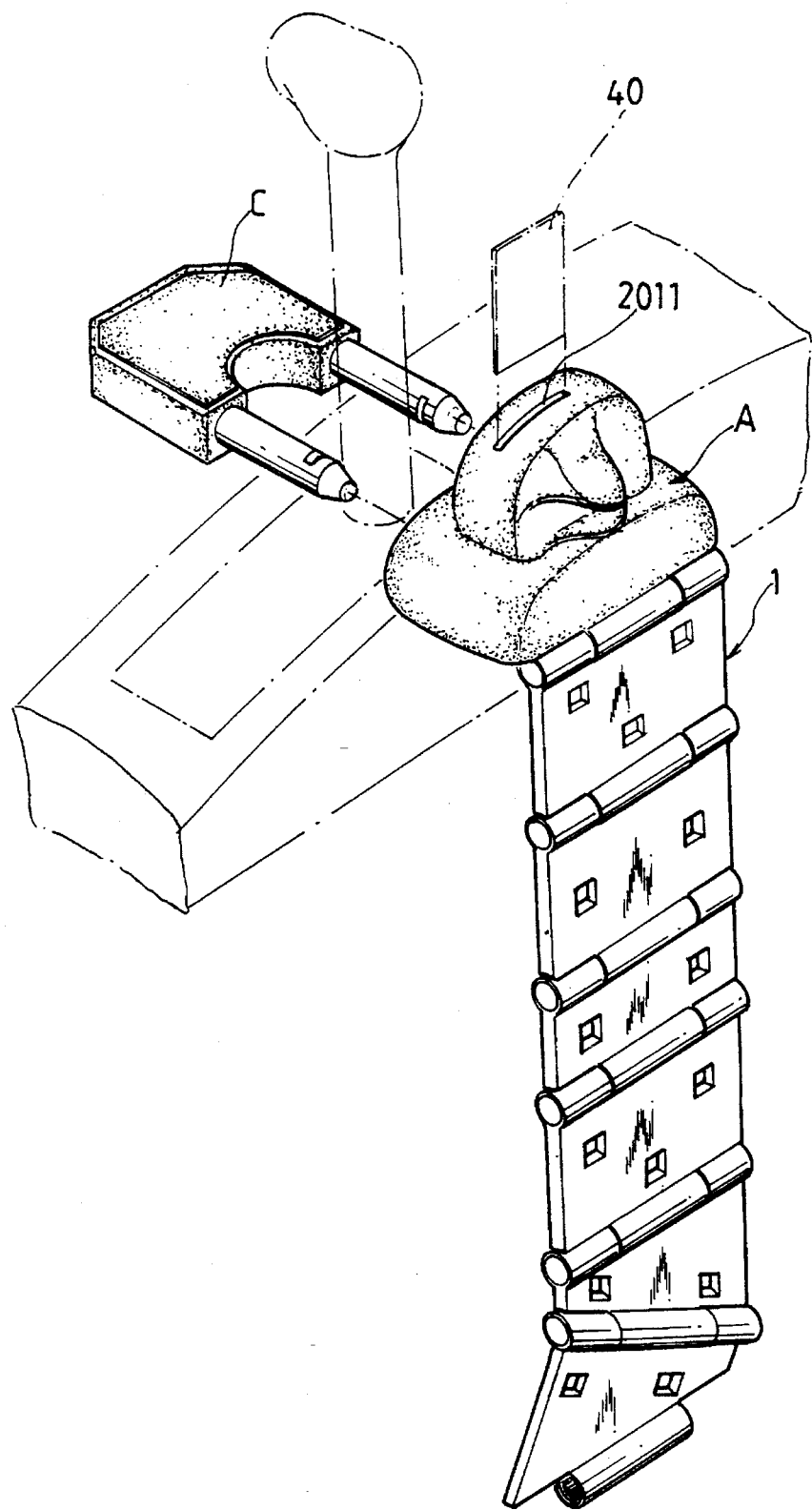
FIG. 10 is a perspective view showing the lock of FIG. 8 being assembled on an automatic shift lever of a car.
Figure 11B:
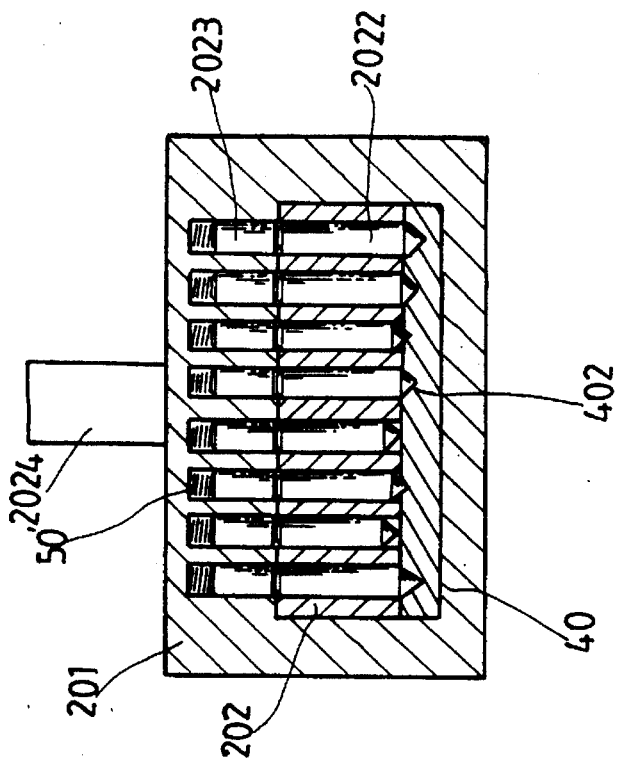
FIG. 11B is a schematic view showing the locking mechanism in the lock of FIG. 8 has its locating shafts aligned in position by the locking card.
Figure 11A:
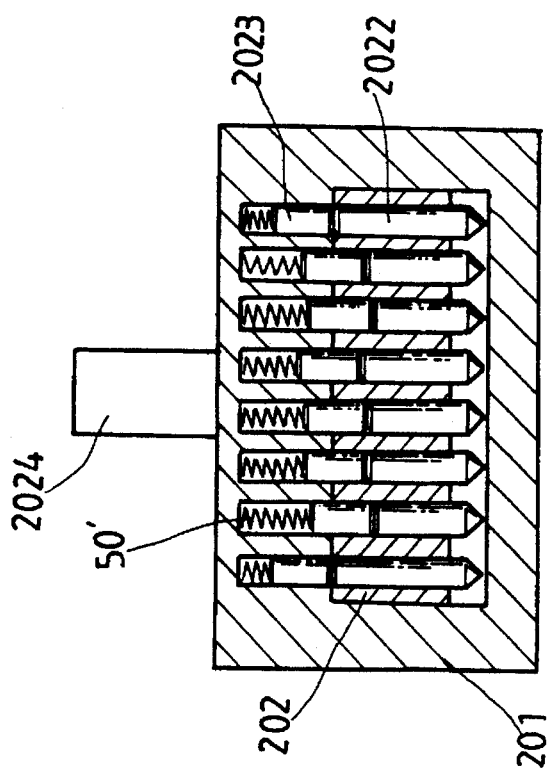
FIG. 11A is a sectional view of a locking mechanism in the lock of FIG. 8, which mechanism is in its locking state.
Figure 12A:
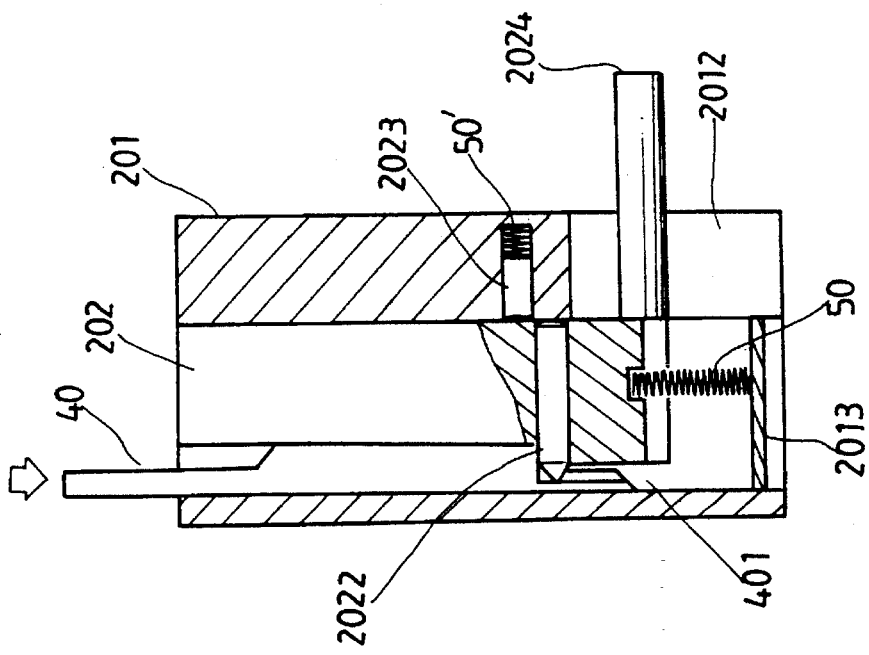
FIG. 12A is a sectional view of a position limiting groove of a locking card and the corresponding locating shaft of the lock of FIG. 8.
Figure 12B:
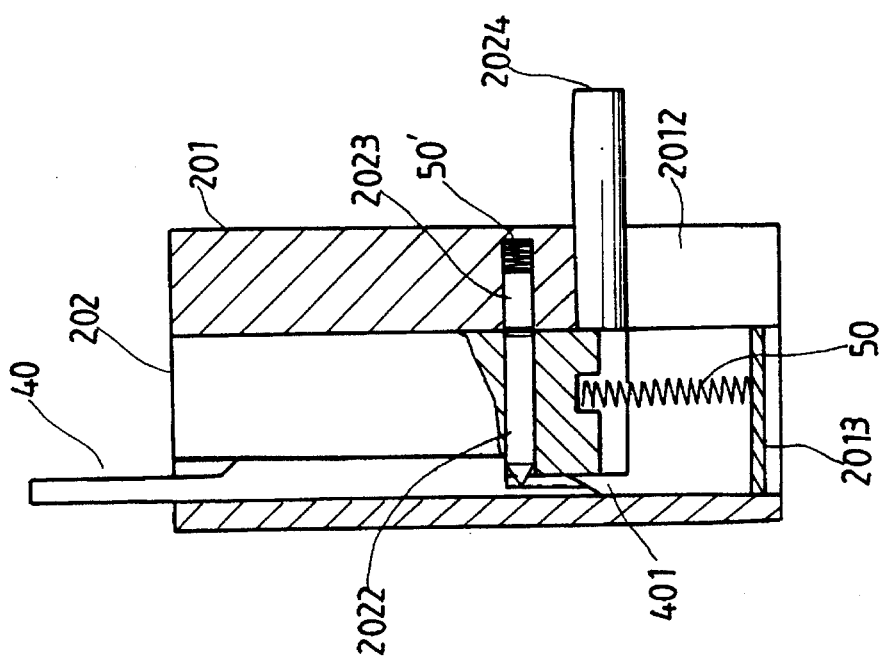
FIG. 12B is a sectional view showing the locking card of the lock of FIG. 8 presses the position limiting shaft through the position limiting groove to let a slide block move downward synchronically.
Figure 13:
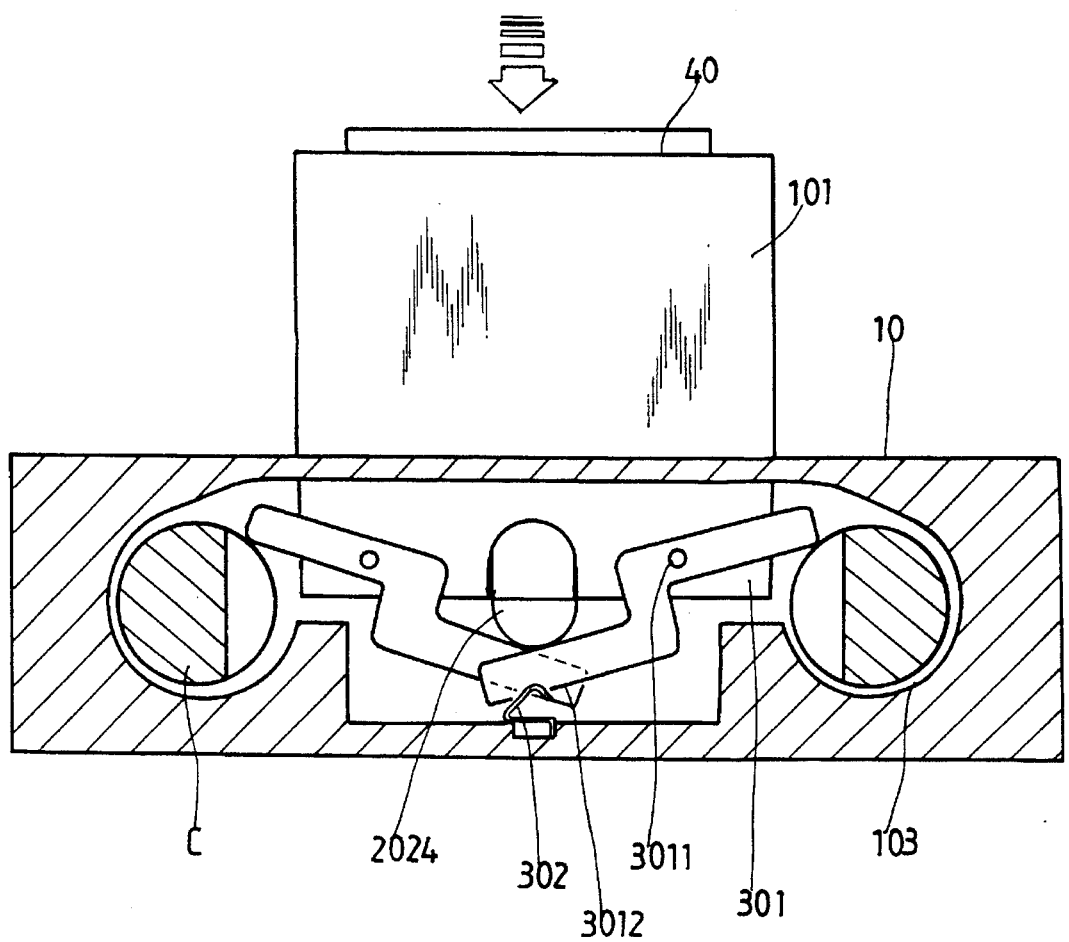
FIG. 13 is a sectional view showing a latching mechanism of the lock of FIG. 8 is associated with the locking mechanism in operation.
Figure 14:
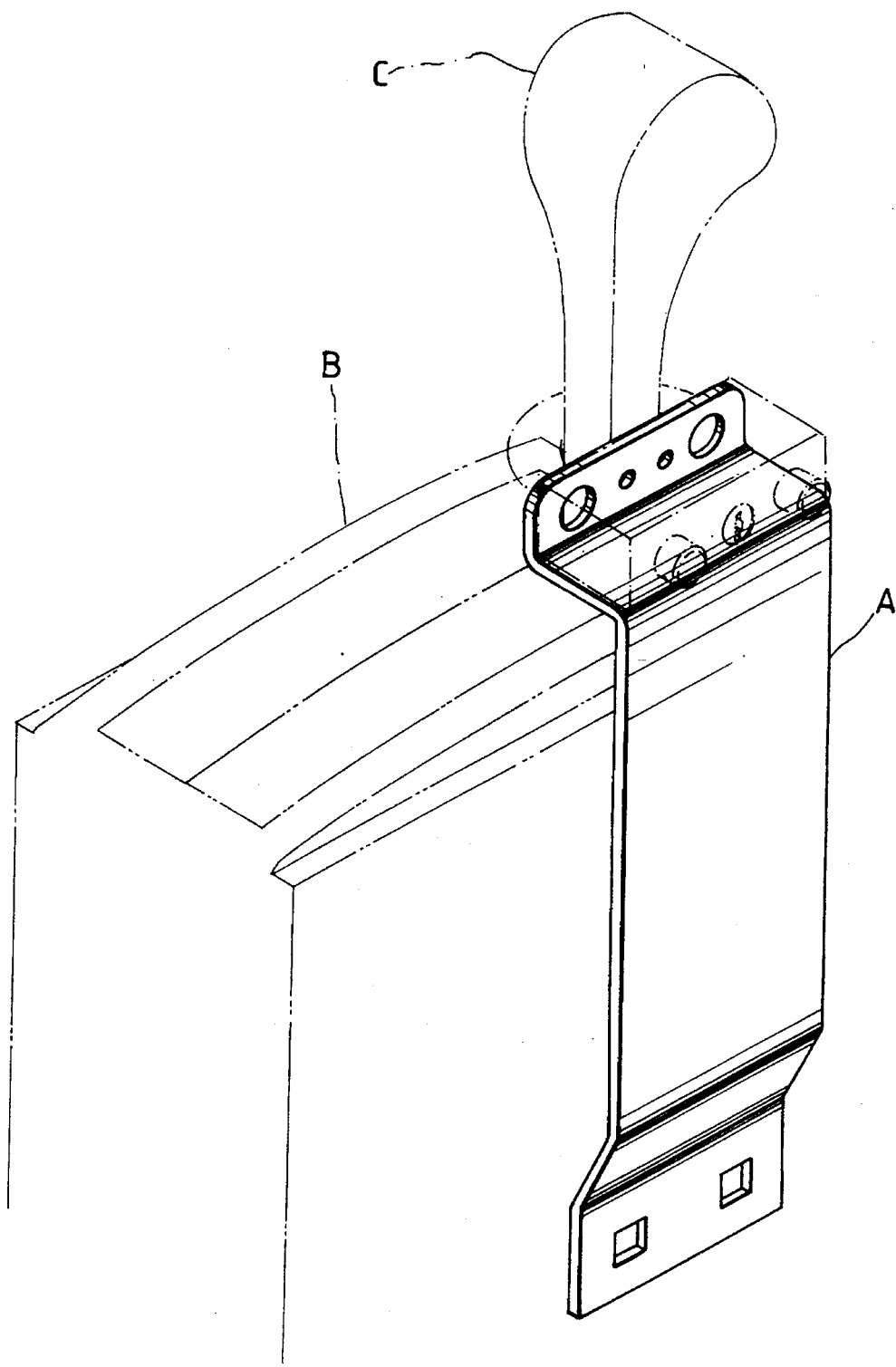
FIG. 14 is a perspective view showing a conventional mounting rack for a lock and the shift lever in a car.

The assembled lock A (referring to FIG. 10) is mounted outside the card insertion type lock for the shift lever on a car, a U shaped locking hook C can be inserted into the above mentioned locking holes 103 (referring to FIG. 8) to prevent the shift lever from moving forwardly and backwardly for shifting; when the lock A is to be unlocked, one needs only to insert the insertion type locking card 40 into the card insertion slot 2011 to push away the dust-proof piece 701 (referring also to FIG. 8), the lock can thus be unlocked. Before the locking card 40 is inserted into the card insertion slot 2011, due to the abutting of the locating shafts 2022 having different length in the above mentioned slide block 202 (referring to FIG. 11A) backwardly against the card insertion slot 2011 by the force exerted by the segments of shaft 2023 and the springs 50', the depth that the segments of shaft 2023 extending into the transverse holes 2021 will be different from one another; beside supporting the slide block 202 to prevent it from sliding vertically by interposing of the segments of shaft 2023 between the slide block 202 and the fixed seat 201, the segments of shaft 2023 with different length will also have a theft-proof function preventing the thieves from unlocking; when a user inserts the locking card 40 into the card insertion slot 2011 (referring to FIG. 11B), because the locking card 40 has on its front face a plurality of holes 402 having different diameter and opposite to the locating shafts 2022, while all the locating shafts 2022 are pressed into the holes 402 by the springs 50' simultaneously, the depth they are extending in the holes 402 depends on the diameter of the holes 402, the larger the diameter, the deeper the extent that the conical heads of the locating shafts can be pressed in the holes 402, but all for the sake of allowing all the connecting points between the locating shafts 2022 and the segments of shaft 2023 to be in the same line, and this line is exactly the intersection of the slide block 202 and the inner wall of the fixed seat 201, by this arrangement, the slide block 202 can be moved downward. On each side of the bottom of the front face of the locking card 40 there is a position limiting groove 401 (referring to FIG. 12A), when all the locating shafts 2022 and the holes 402 are aligned one with a corresponding one, the right and left end locating shafts 2022 are connected with the top end of the position limiting grooves 401, so that the uppermost surfaces of the position limiting grooves 401 form the operating surfaces which move the slide block 202 downwardly, the force exerted by inserting of the locking card 40 downward by the user is the action force rendering the slide block 202 to slide downward (referring to FIG. 12B) and thus pressing the springs 50 against the upper face of the insertion plate 2013, the operating rod 2024 at the front of the slide block 202 also moves downward with it; before operation, the operating rod 2024 extends above the central intersection portion of the right and left Z shaped stop pieces 301 (referring to FIG. 13), the arc shaped recesses 3012 are formed as above mentioned each at the bottom of each stop piece 301, the stop pieces 301 which are pressed upwardly by the elastic element 302 are thereby kept in horizontal positions, the ends of the stop pieces 301 are on the way of the U shaped locking hook C and limited in two dents provided in the U shaped locking hook C to latch the same, while if the operating rod 2024 is operated to move downward, the central intersection portion of the right and left stop pieces 301 is pushed downward and presses the elastic element 302, so that the ends of the stop pieces 301 will be raised up to be out of the way of the U shaped locking hook C, then the U shaped locking hook C gets free to retract from the locking holes 103 for unlocking the lock; when the locking card 40 is lifted off, the springs 50 at the bottom of the slide block 202 (referring to FIG. 12B) will push the slide block 202 upwardly to the unoperation position (as shown in FIG. 12A and 11A), the stop pieces 301 will return to the original positions due to the returning of the operating rod 2024 together with the slide block 202 by the spring force; accordingly, it will be apprent that when the present invention is in use, it only needs to insert the locking card 40 into the card insertion slot 2011 to retract the U shaped locking hook C from the locking holes 103 to unlock the lock (other springs provided at the bottom of the locking holes 103 are of conventional technique and are not described here), an object of convenience in use thus is achieved.

Further, the position limiting grooves 401 at both sides on the bottom of the front surface of the locking card 40 (referring to FIG. 8) are used as action points for pushing downward the slide block 202, they may alternatively provided at any positions corresponding to those of any locating shafts 2022 to achieve the same function, this can increase complicacy of the locking card 40 to increase the safety of the locking card 40 in duplicating-proofing.

My invention may assume numerous forms and is to be construed as including all modifications and variations falling within the scope of the appended claims.

I claim:

1. An improved structure of a lock mounting rack for a shift lever of a car, said structure comprising;

a receiving seat for receiving a lock;

a plurality of connecting plates with different length, width, size and shape, being connected to the bottom end of a receiving seat and having a plurality of locating holes, said connecting plates being arranged to conform with the shape of the receiving seat for said shift lever;

a plurality of position limiting rods each being in the form of an elongated polygonal shaft, the lengths thereof being shorter than the width of said plates, said position limiting rods having different length for attachment to the plates of rectangular shape and those with tapered sides, a first end of each position limiting rod being enlarged to form a first stop piece, a second end being provided with a threaded hole; and a plurality of screws each having a first end thereof of a conical shape with a narrower end of said conical shaft connecting with a second stop piece provided on said screw.

2. The improved structure of a lock mounting rack for a shift lever of a car as stated in claim 1, wherein said receiving seat has a fixing sleeve on a lateral side thereof.

3. The improved structure of a lock mounting rack for a shift lever of a car as stated in claim 1 further comprising fixing sleeves on opposite sides of each of said connecting plates.

4. The improved structure of a lock mounting rack for a shift lever of a car as stated in claim 3, wherein said fixing sleeves have inner walls defining polygonal openings.

5. The improved structure of a lock mounting rack for a shift lever of a car as stated in claim 4, wherein the number of angles in each of said polygonal inner walls is twice the number of angles on the polygonal shaft of each of said position limiting rods.

6. The improved structure of a lock mounting rack for a shift lever of a car as stated in claim 2 wherein both ends of each of said fixing sleeves are extended to provide two position limiting holes.

7. The improved structure of a lock mounting rack for a shift lever of a car as stated in claim 1, wherein said mounting rack further includes a card insertion lock for said shift lever, said card insertion lock for said shift lever comprising;

- a lock seat, a top end thereof being provided a receiving chamber, and a front side thereof being provided with two locking holes;
- a locking mechanism having a fixed seat, a slide block and an insertion plate, said slide block being provided within said fixed seat and having a plurality of transverse holes for receiving a plurality of locating shafts having conical heads which each is connected with a segment of one of said locating shafts and a spring to bias each of said locating shafts in a first direction;
- a latching mechanism having two stop pieces contacting an elastic element;
- an insertion type locking card having a line of horizontally aligned holes having different diameters;
- an operating rod provided beneath said transverse holes of said slide block, said operating rod abutting against said stop pieces of said latching mechanism; and
- said locking card having at each side on a bottom of a front surface thereof a position limiting groove, whereby when said locating shafts are inserted into said transverse holes, the conical heads of the locating shafts corresponding to said transverse holes will extend into said position limiting grooves, if said locking card is pressed down, said position limiting grooves and said corresponding locating shafts will be pressed to press down said slide block, and in turn said operating rod presses down said latch mechanism to unlock the locking mechanism.

8. The improved structure of a lock mounting rack for a shift lever of a car as stated in claim 7, wherein said two stop pieces of said latching mechanism have intersection portions located beneath said operating rod, bottoms of said stop pieces each have an arc shaped recess, and a pivot-point at an upper portion of each of said two stop pieces is provided between locking holes for the pivoting of said stop pieces on said locking seat.

9. The improved structure of a lock mounting rack for a shift lever of a car as stated in claim 7, wherein a top end of said fixed seat of said locking mechanism has a card insertion slot.

10. The improved structure of a lock mounting rack for a shift lever of a car as stated in claim 9, wherein an operating hole is provided on a front end of said fixed seat.

11. The improved structure of a lock mounting rack for a shift lever of a car as stated in claim 7, wherein said receiving chamber of said lock seat has on front and rear sides a plurality of fixing grooves; and wherein a housing comprising an inner hood and a protecting sleeve, on a bottom end of said inner hood there are fixing flanges engaging said fixing grooves.

12. The improved structure of a lock mounting rack for a shift lever of a car as stated in claim 11, further comprising an outer hood for covering said housing and having on a top a dust-proof piece aligned with said card insertion slot.

* * * * *